O. CROSS.
THRESHING MACHINE.
APPLICATION FILED JUNE 5, 1914.
1,179,806.
Patented Apr. 18, 1916.
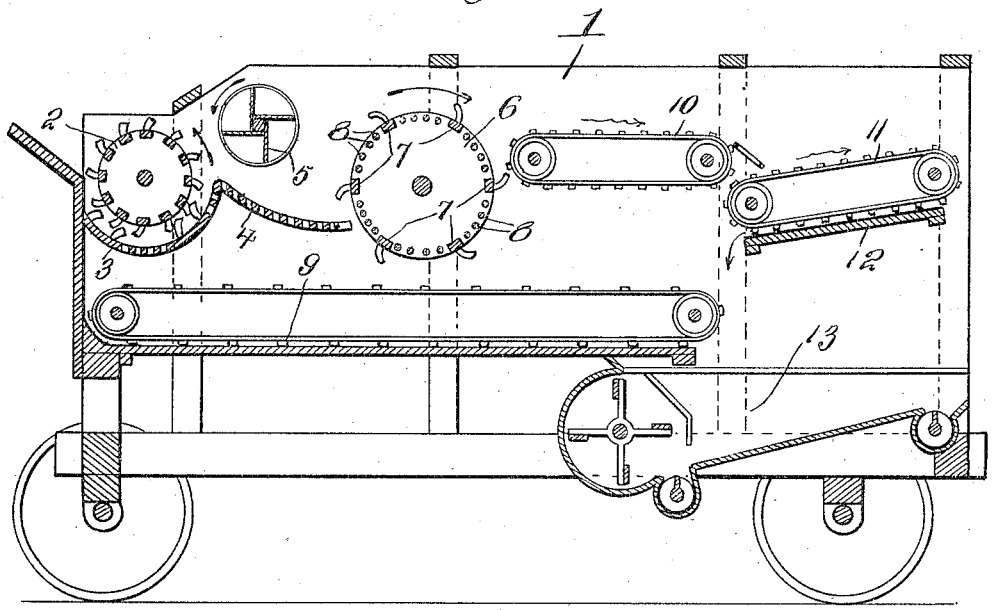
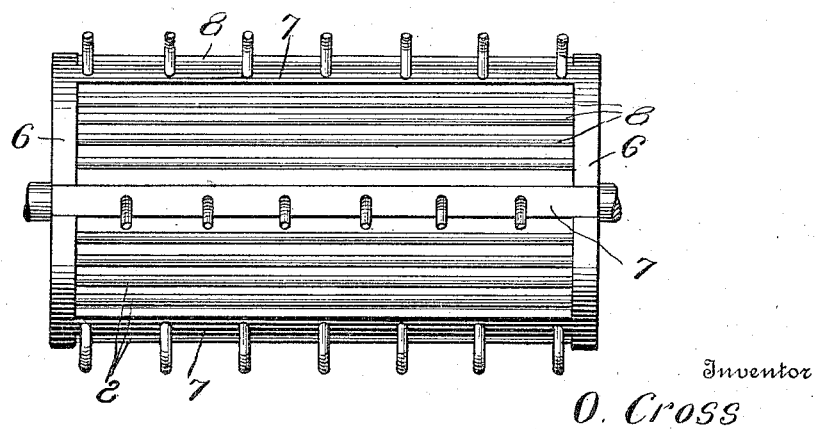
Witnesses
J. T. L. Wright
V. B. Hillyard
Inventor
O. Cross
By Victor J. Evans
Attorney

UNITED STATES PATENT OFFICE.

ORLANDO CROSS, OF GATES, WASHINGTON.

THRESHING-MACHINE.

1,179,806.   Specification of Letters Patent.   Patented Apr. 18, 1916.

Application filed June 5, 1914. Serial No. 843,248.

*To all whom it may concern:*

Be it known that I, ORLANDO CROSS, a citizen of the United States, residing at Gates, in the county of Thurston and State of Washington, have invented new and useful Improvements in Threshing-Machines, of which the following is a specification.

The primary purpose of the present invention is to effect a thorough and rapid separation of the grain from the straw during the process of threshing thereby preventing the loss of grain, the choking of the machine or the expenditure of unnecessary power in the separating of the grain from the straw, chaff, and the like.

The invention specifically considered provides a rotary separator of peculiar and novel formation which lifts the straw thereby loosening and lightening the same whereby ample provision is had for escape of the grain which passes directly through the separator to the rake whereby the grain is delivered to the separating mechanism proper, whereby chaff and other light material is blown off and the heavy grain separated from the lighter grain.

The invention moreover consists of a rotary lifter or separator arranged above the grain rake and between the straw carrier and the beater whereby the straw is elevated and at the same time thrown forward upon the carrier, all grain thus being loosened and given an opportunity to escape thereby preventing any waste.

The invention consists of the novel features, details of construction and combination of parts, which hereinafter will be more particularly set forth illustrated and claimed.

In the drawings hereto attached:—Figure 1 is a vertical longitudinal section of a threshing machine embodying the invention. Fig. 2 is a detail view of the rotary lifter and separator.

Corresponding and like parts are referred to in the following description, and indicated in both views of the drawings, by the same reference characters.

The numeral 1 designates the casing of the machine which receives the working parts. The threshing mechanism comprises the toothed cylinder 2 and concave 3, such mechanism being arranged at the receiving end of the casing. A grate 4 is located in the rear of the concave 3 and about in the plane thereof. A rotary beater 5 is arranged above the grate 4. The rotary lifter and separator is arranged in the rear of the grate 4 and beater 5 and comprises end pieces 6, toothed bars 7 and spaced rods or like elements 8. The rotary lifter or separator is adapted to be driven in a clock-wise direction so that its upper portion travels from front to rear thereby moving the straw from the beater 5 toward the straw carrier. The end pieces 6 are secured to a shaft which is journaled in the sides of the casing 1. The toothed bars 7 are spaced apart, the teeth being curved in their length and arranged to face toward the front or receiving end of the machine when occupying a position upon the upper forward portion of the lifter. The rods or elements 8 have a parallel arrangement and are located between the toothed bars 7 and serve to prevent the straw from falling between the toothed bars while at the same time offering no obstruction to the free passage of the grain which is adapted to pass freely between the rods 8 through the lifter or separator to the grain rake 9 located beneath the threshing mechanism, the grate 4, lifter and a portion of the straw carrier.

The straw rake comprises two endless carriers 10 and 11 which are arranged in the rear of the rotary lifter or separator, each of such carriers being of the endless type and comprising belts and cross slats, the latter being spaced apart to provide an escape for any grain that may be carried forward upon the straw rake with the straw. A return pan 12 is arranged between the carrier 11 to direct any grain received thereon to the grain separating mechanism proper, which is located at the rear of the casing. The grain separating mechanism is designated by the reference numeral 13 and may be of any variety such as commonly employed in connection with threshing machines.

In the operation of the machine the grain is threshed in the usual manner by passing between the cylinder 2 and concave 3. The straw passing over the grate 4 and at the same time being subjected to the action of the beater 5. The straw is loosened and lightened by means of the lifter or separator which elevates the straw and carries the same upward and rearward and delivers it upon the carrier 10. During this operation, all or nearly all the grain is loosened and liberated from the straw and falling passes between the spaced elements 8 of the lifter and separator and drops through the latter upon the rake 9 and is delivered thereby to the grain separating mechanism 13.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed. It is noted that the rotary lifter places the straw above the flying grain from the cylinder.

Having thus described the invention, what is claimed as new is:—

In a device of the class described, a member consisting of a pair of end disks, a shaft upon which said disks are mounted in spaced apart relation, a circumferentially extending series of transversely disposed rods secured upon and between said disks flush with the periphery thereof, a circumferentially spaced apart series of transversely disposed slats secured at opposite ends upon said disks flush with the periphery thereof, all of said rods being spaced concentrically around said shaft and a longitudinally arranged series of teeth extending from said slots outwardly of the periphery of said disks, said slots being spaced at regular intervals upon said disks and interposed between the rods of said series of rods.

In testimony whereof I affix my signature in presence of two witnesses.

ORLANDO CROSS.

Witnesses:
 ROBT. M. PATON,
 C. R. PATON.

Copies of this patent may be obtained for five cents each, by addressing the "Commissioner of Patents Washington, D. C."